United States Patent
Weber et al.

(10) Patent No.: US 8,845,762 B2
(45) Date of Patent: Sep. 30, 2014

(54) BATTERIES AND COMPONENTS THEREOF AND METHODS OF MAKING AND ASSEMBLING THE SAME

(75) Inventors: Derek R. Weber, Rochester, NY (US); Alastair Gordon Anderson, Wiesbaden (DE); Steven J. Spencer, Rochester, NY (US); Paul F. Spacher, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 852 days.

(21) Appl. No.: 12/403,579

(22) Filed: Mar. 13, 2009

(65) Prior Publication Data

US 2009/0255109 A1    Oct. 15, 2009

Related U.S. Application Data

(60) Provisional application No. 61/043,614, filed on Apr. 9, 2008.

(51) Int. Cl.
| | | |
|---|---|---|
| *H01M 4/82* | (2006.01) | |
| *H01M 10/50* | (2006.01) | |
| *H01M 6/50* | (2006.01) | |
| *H01M 2/14* | (2006.01) | |
| *H01M 10/6557* | (2014.01) | |
| *H01M 10/647* | (2014.01) | |
| *H01M 10/6567* | (2014.01) | |
| *H01M 10/613* | (2014.01) | |

(52) U.S. Cl.
CPC ............ *H01M 10/5004* (2013.01); *H01M 2/14* (2013.01); *H01M 10/5059* (2013.01); *Y02E 60/12* (2013.01); *H01M 10/5032* (2013.01); *H01M 10/5075* (2013.01)
USPC .......................................... 29/623.1; 429/120

(58) Field of Classification Search
USPC .............................................. 29/623.1, 623.2
See application file for complete search history.

(56) References Cited

U.S. PATENT DOCUMENTS

| | | | |
|---|---|---|---|
| 4,060,670 A | | 11/1977 | Tamminen |
| 5,695,891 A | | 12/1997 | Misra et al. |
| 5,836,383 A | * | 11/1998 | Zwittig .......................... 165/167 |
| 6,162,559 A | | 12/2000 | Vutetakis et al. |
| 2003/0091884 A1 | * | 5/2003 | Scartozzi ......................... 429/32 |
| 2005/0089750 A1 | * | 4/2005 | Ng et al. ........................ 429/120 |
| 2006/0214641 A1 | * | 9/2006 | Cho ............................. 320/150 |

FOREIGN PATENT DOCUMENTS

| | | |
|---|---|---|
| DE | 60213474 T2 | 3/2007 |
| EP | 1387424 A2 | 2/2004 |
| EP | 1577966 A2 | 9/2005 |
| WO | 9905746 A1 | 2/1999 |

OTHER PUBLICATIONS

German Office Action dated Apr. 23, 2014; Application No. 102009016573.8 ; Applicant: GM Global Technology Operations LLC; 6 pages.

* cited by examiner

*Primary Examiner* — Muhammad Siddiquee
(74) *Attorney, Agent, or Firm* — BrooksGroup

(57) ABSTRACT

Exemplary embodiments include method of sealing battery cooling plates, and methods of assembling battery using battery cooling plate racks and a single component including multiple cooling plates and connection portions therebetween.

2 Claims, 4 Drawing Sheets

_BATTERIES AND COMPONENTS THEREOF AND METHODS OF MAKING AND ASSEMBLING THE SAME_

CROSS-REFERENCE TO RELATED APPLICATIONS

This application claims the benefit of U.S. Provisional Application No. 61/043,614 filed Apr. 9, 2008.

TECHNICAL FIELD

The field to which the disclosure generally relates includes batteries and components thereof, and methods of making and assembling the same, and in particular to battery cooling plates or fins.

BACKGROUND

For the efficient operation of some batteries, for example lithium ion batteries, it may be desirable to cool the battery. This may be accomplished by flowing a liquid coolant through a cooling plate or fin, which may be positioned adjacent to a battery cell or interposed between battery cells. As the commercial use of such battery increases, effective methods of making components thereof and manufacturing assembly operations become more important.

SUMMARY OF EXEMPLARY EMBODIMENTS OF THE INVENTION

One exemplary embodiment includes a method of assembling battery cooling plates which are connected together in a rack form with a space provided between cooling plates sufficient to receive two battery cells. A spring element is sandwiched between two battery cells to provide a battery pack subassembly that is compressed so that the thickness of the battery pack subassembly in the compressed state is less than the distance between two adjacent cooling plates in the rack. The battery pack subassembly is then slid between two adjacent cooling plates once the battery pack subassembly is positioned between two adjacent cooling plates in the rack, the spring element expands to press the first battery cell against the first cooling plate and the second battery cell against the second cooling plate.

Another exemplary embodiment includes a method including providing a single substrate having a plurality of spaced-apart battery cooling plates defined therein. A battery cell may be attached to one or both sides of each cooling plate. The substrate includes a connection portion joining adjacent cooling plates and the connection portion includes at least one cooling channel communicating with each of the adjacent cooling plates. The arrangement provides multiple cooling plates formed as one component in series. The substrate may be bent at the connection portion so that adjacent cooling plates and the batteries attached thereto may be provided in an overlying position with respect to each other.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the following detailed description and the accompanying drawings.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
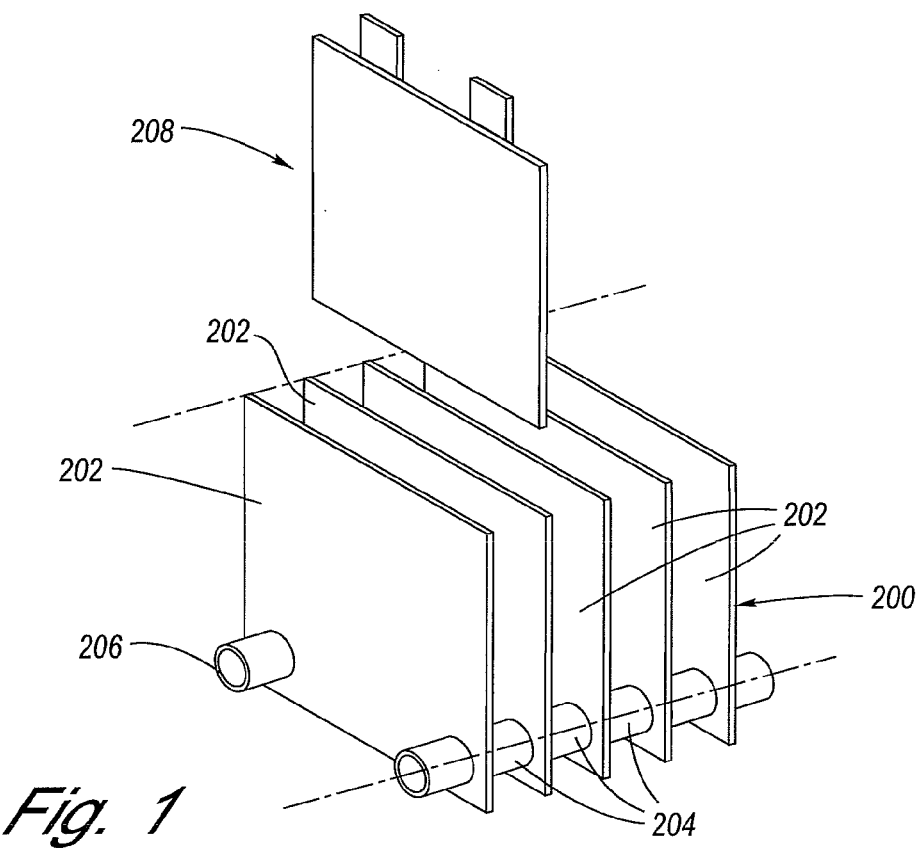
FIG. 1 illustrates a method of assembling a battery using a cooling plate rack and a battery pack subassembly according to one exemplary embodiment.

Referring now to FIGS. 1-5, one exemplary embodiment includes a method of making a battery assembly including a plurality of battery cells and cooling plates. As shown in FIG. 1, in one illustrative embodiment a radiator assembly 200 may be provided including a plurality of cooling plates 202 having cooling fluid flow paths defined therein and a first series of components 204 to provide a first manifold portion and a second series of components 206 to provide a second manifold for flowing cooling fluid from one cooling plate to the next cooling plate in series. A space 224 may be provided between the adjacent main body portions of cooling plates 202 into which a battery pack subassembly 208 may be inserted.

Figure 2:
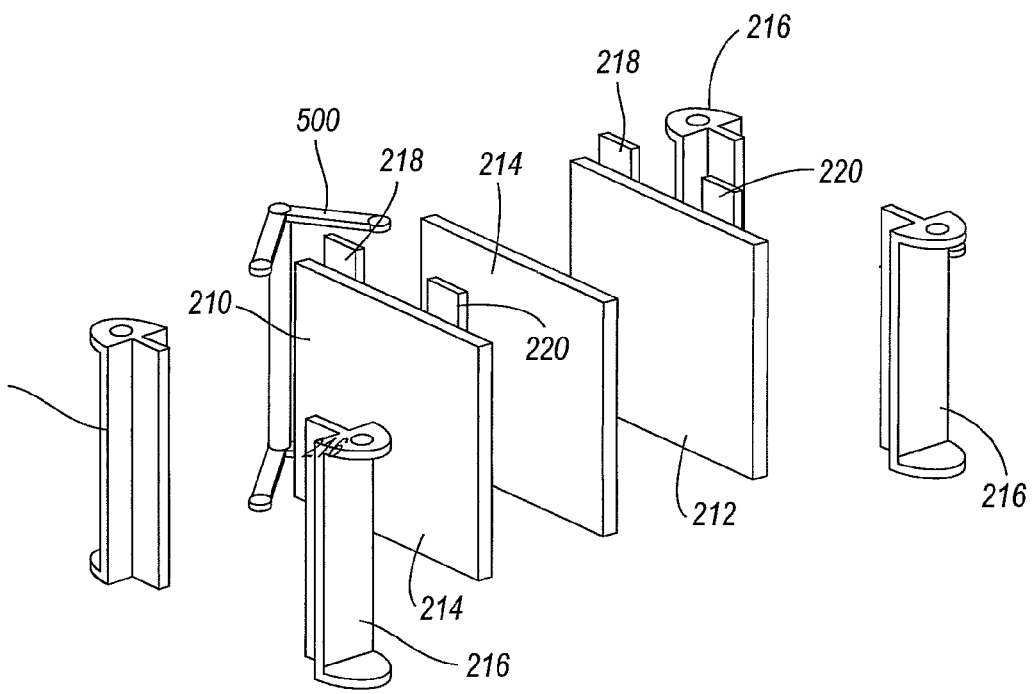
FIG. 2 is an exploded view of a battery pack subassembly and associated holders according to one exemplary embodiment.
Figure 3:
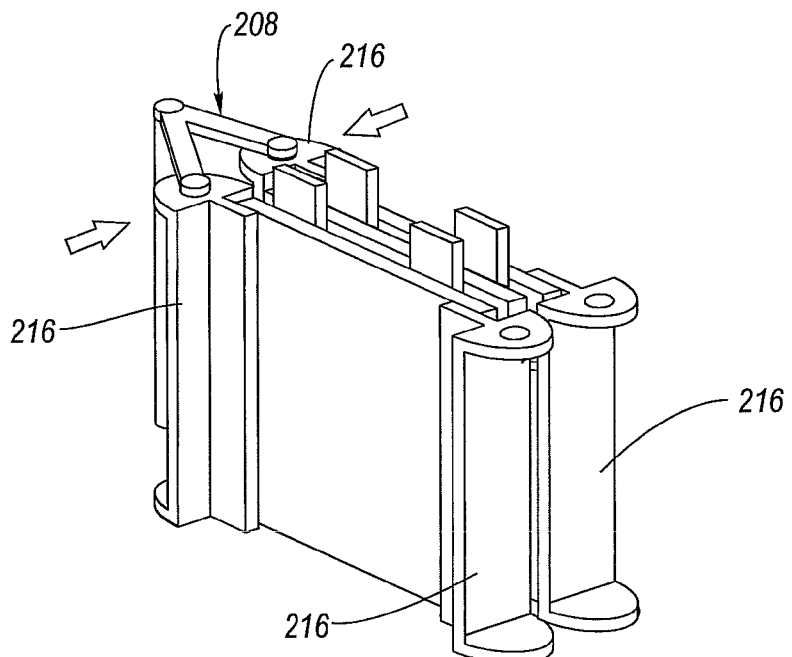
FIG. 3 is an illustration of a holder-battery pack subassembly in a compressed state according to one exemplary embodiment.

Referring now to FIG. 2, in one exemplary embodiment, the battery pack subassembly 208 may include a first battery cell 210 and a second battery cell 212. A spring element 214 may be interposed between the first battery cell 210 and the second battery cell 212. In one embodiment, the spring element 214 may be one or more wave-shaped substrates for applying a biasing force against each of the first battery cell 210 and second battery cell 212. In other embodiments the spring 214 may be a resilient foam, a rubber or elastomeric material. Each of the first battery cell 210 and second battery cell 212 may include a first terminal 218 and second terminal 220. The first battery cell 210, spring element 214 and second battery cell 212 may be held together in a compressed state by one or more holders 216. In one embodiment multiple holders 216 may be used. In one embodiment the battery pack subassembly 208 and holder 216 may be held together by a hydraulic clamp. FIG. 3 illustrates an exemplary embodiment of a holder-battery pack subassembly wherein the first battery cell 210, spring element 214 and second battery cell 212 are held together in a compressed state.

Figure 4:
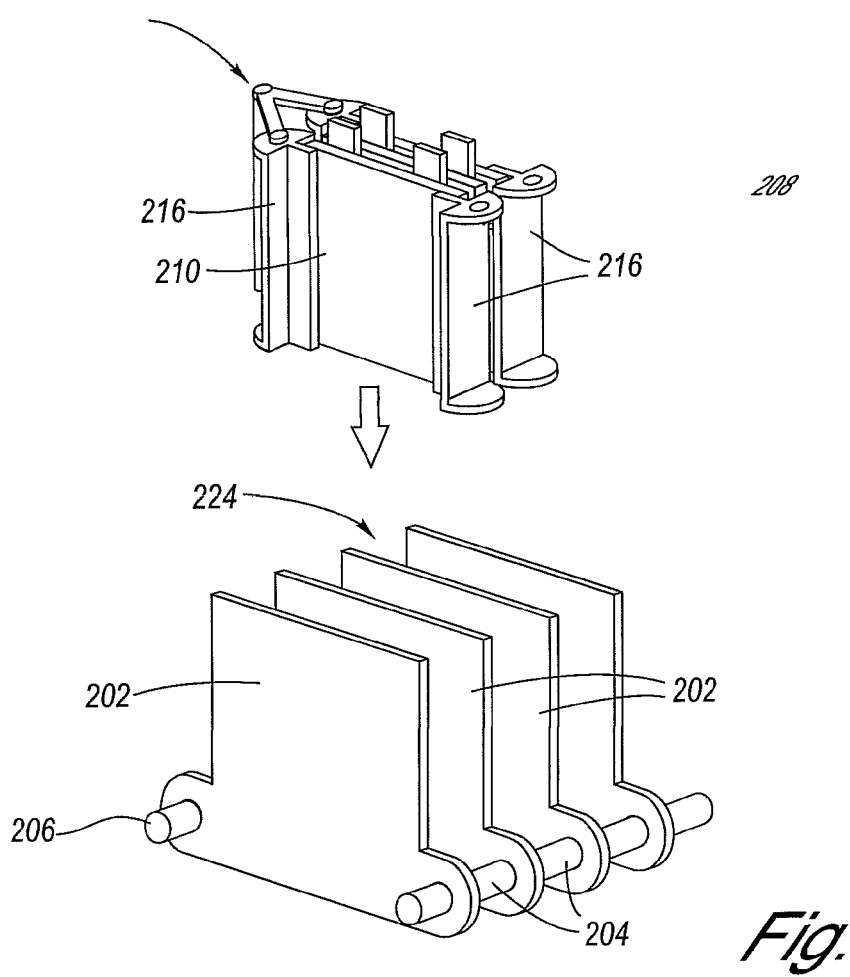
FIG. 4 illustrates a method of assembling a battery according to one exemplary embodiment.

Referring now to FIG. 4, in one exemplary embodiment, the holder-battery pack subassembly 222 may be utilized to insert the battery pack subassembly 208 into the space 224 provided between the main body portions of adjacent cooling plates 202. In one exemplary embodiment, the holder-battery pack subassembly 222 may be placed over adjacent cooling plates 202 so that the holders 216 at least partially rest on a portion of the adjacent cooling plates 202. The holder-battery pack subassembly 222 may be positioned so that the battery pack subassembly 208 is aligned with the space 224 and the battery pack subassembly 208 may be pushed downward into the space 224 so that the battery pack subassembly 208 is completely received and the space 224 and the spring element 214 forces the first battery cell against a first cooling plate and so that the spring element 214 faces the second battery cell 212 against a second adjacent cooling plate 202 to enhance the heat transfer between the battery cells 210, 212 in the cooling plates 204.

Figure 5A:
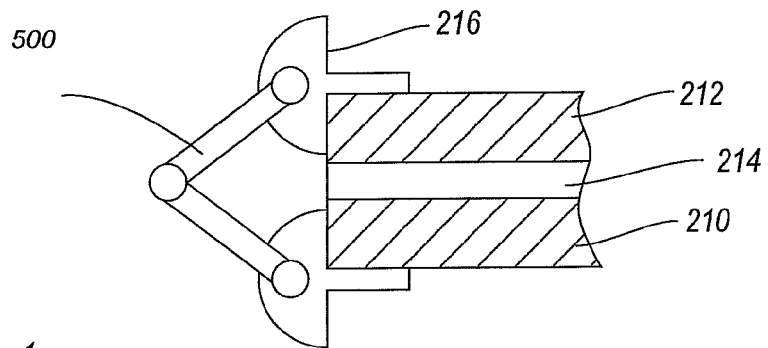
FIG. 5A illustrates a method of assembling a battery according to one exemplary embodiment.
Figure 5B:
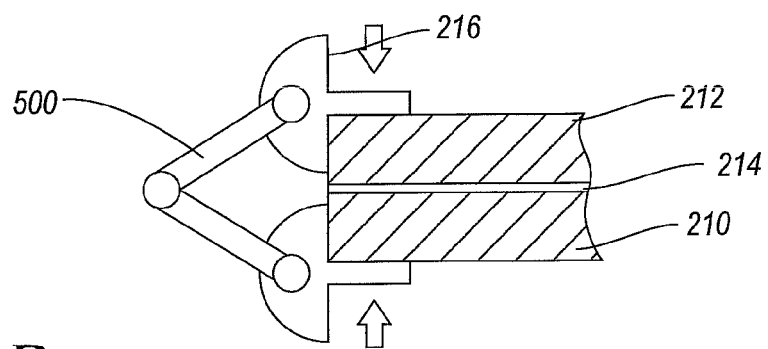
FIG. 5B illustrates a method of assembling a battery according to one exemplary embodiment.
Figure 5C:
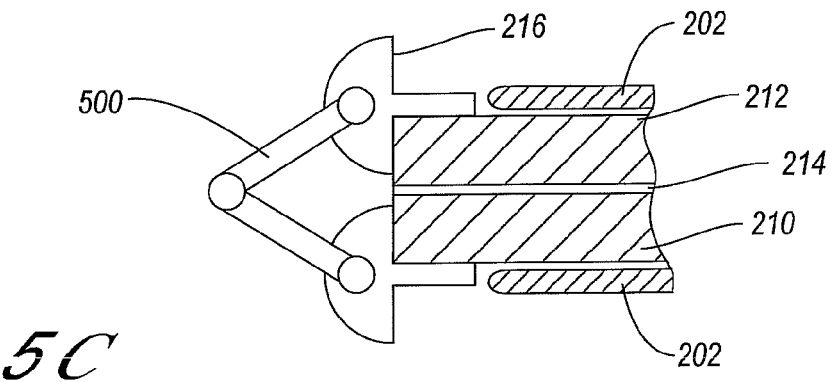
FIG. 5C illustrates a method of assembling a battery according to one exemplary embodiment.
Figure 5D:
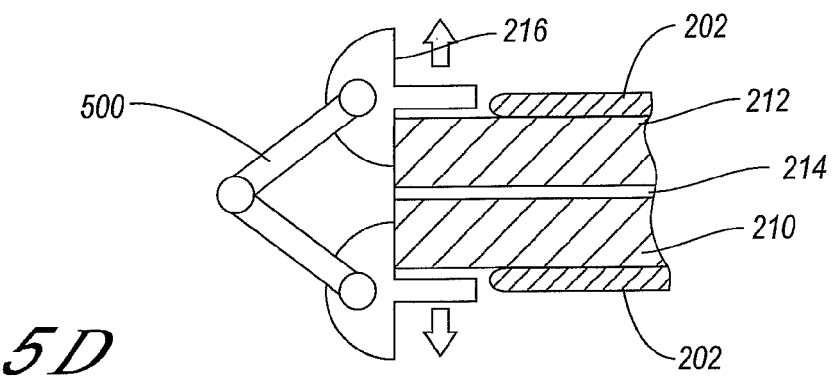
FIG. 5D illustrates a method of assembling a battery according to one exemplary embodiment.

Referring now to FIG. 5A, an electric, pneumatic or hydraulic assembly jig clamp may close the holders 216 around the battery pack 208 including the first and second battery cells 210, 212 with the spring therebetween. The assembly jig compresses the battery pack 208 (FIG. 5B and then is used to insert the battery pack 208 between two cooling plates 202 of the rack (FIG. 5C). Once the battery pack 208 has been inserted into the rack the assembly jig opens so that the holders 216 release their grip on the battery pack 208.

Referring now to FIGS. 6-9, another exemplary embodiment includes a method of manufacturing a battery assembly including a continuous component 300 including multiple cooling plates formed in series. The continuous component 300 may include a first substrate 302, which may define at least in part a plurality of cooling plates and connection portions extending therebetween. A second substrate (not shown) may be stamped or otherwise formed to define a pattern of lands and channels. The first substrate 302 may cover the lands and channels. For example, the first substrate 302 may define at least a portion of a first cooling plate 304, a first connection portion 306 extending therefrom and connecting to a second cooling plate 308, a second connection portion 310 extending therefrom and connecting to a third cooling plate 312, and a third connection portion 314 extending therefrom and connecting to a fourth cooling plate 316 and a fourth connection portion 318 extending therefrom. The pattern of a first cooling plate, a connection portion extending therefrom and connecting to a second cooling plate may be repeated numerous times depending upon the size of the battery assembly to be manufactured. The connection portions 306, 310, 314, 318 may be of varying sizes and may be positioned at various locations. In one exemplary embodiment, the first connection portion 306, second connection portion 310, third connection portion 314 and fourth connection portion 318 may be provided by forming a first window 320, a second window 322, a third window 324 and a fourth window 326 in the substrate 302 so that the connection portions 306, 310, 314 and 318 have a height substantially less than the cooling plates 304, 308, 312, 316 and so that the connection portions may easily be bent 180°. At least one cooling path 328 is provided through the cooling plates 304, 308, 312, 316 and connection portions 306, 310, 314 and 318. A first battery cell 330 may be positioned over a first face 332 of a cooling plate 304. In one embodiment, the first battery cell 330 is attached to the first face 332, for example by using a thermally conductive adhesive. In another embodiment, the battery cell 330 may be sandwiched in position when the substrate 302 is bent. If desired, a second battery 334 may be positioned over a second face 336 of a cooling plate 304. Battery cells may be attached to or positioned adjacent the first face 332 and/or the second face 336 of each of the cooling plates.

In an embodiment where battery cells are attached to each of the first face 332 and the second face 336 of each cooling plate, the connection portions may be bent 180° so that the battery cell attached to the first face 332 of adjacent cooling plates are positioned immediately adjacent to each other. For example, a battery cell 330 may be attached to each of the first faces 332 of the first cooling plate 304 and another battery cell 330 may be attached to a second cooling plate 308, the first connection portion 306 may be bent in a manner which avoids blocking the cooling passage 328 extending through the first connection portion 306 so that the first battery cells 330 are immediately adjacent to each other. Thereafter, the second connection portion 310 may be bent in the opposite direction so that the second battery cell 330 on each of the second face 336 of the second cooling plate 308 and the third cooling plate 312 are immediately adjacent each other. This method of bending the connection portions may be repeated until a battery of sufficient size has been formed.

Figure 6:
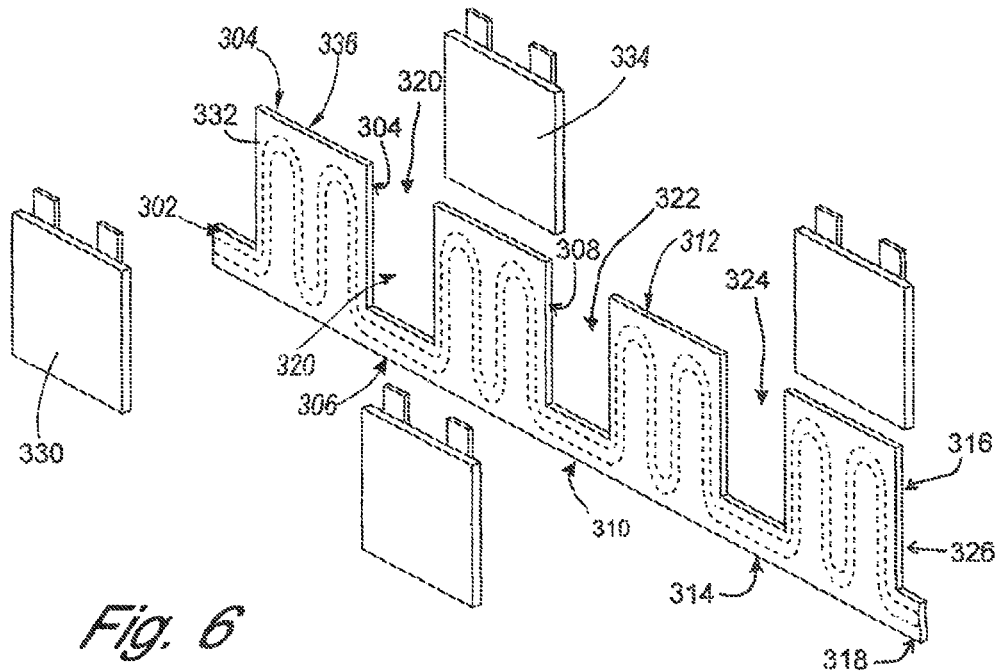
FIG. 6 illustrates a method of assembling a portion of a battery according to one exemplary embodiment.
Figures 7, 8:
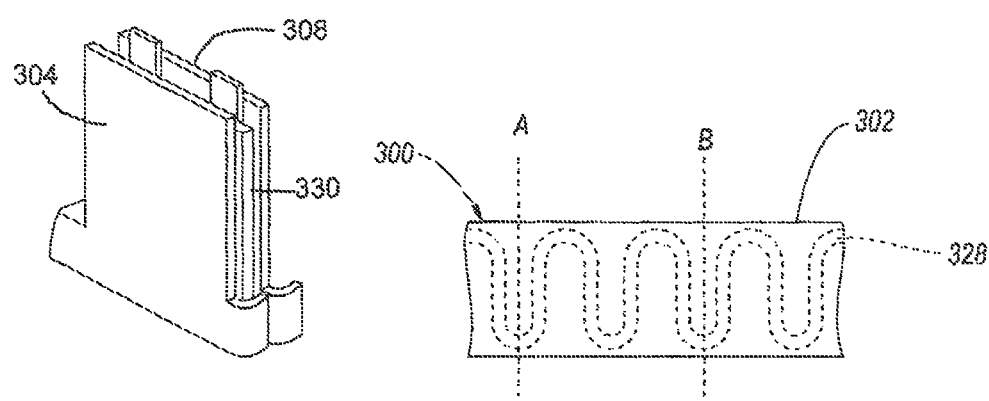
FIG. 7 illustrates a method of assembling a portion of a battery according to one exemplary embodiment.
FIG. 8 illustrates a method of assembling a battery according to one exemplary embodiment.

FIG. 8 illustrates another exemplary embodiment include a method of making a battery using a continuous component 300 having a cooling fluid flow path 328 defined therein wherein the continuous component 300 may be bent at locations A and B and utilized to make a battery in a manner similar to that as described for FIGS. 6-7.

Figure 9:
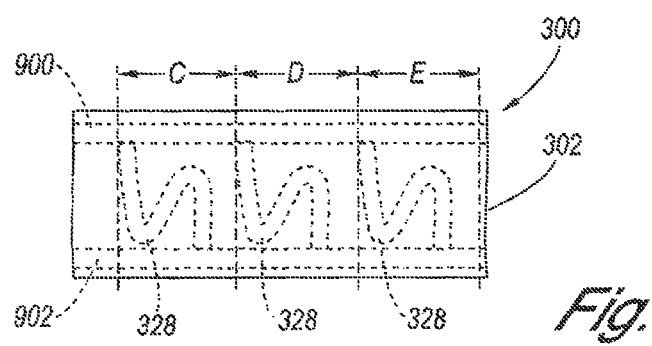
FIG. 9 illustrates a method of assembling a battery according to one exemplary embodiment.

FIG. 9 illustrates another exemplary embodiment include a method of making a battery using a continuous component 300 having a cooling fluid flow paths 328 therein to define a plurality of cooling plate sections (individually defined by lines C, D and E). A cooling fluid inlet manifold flow path 900 and an outlet manifold flow path may each be provided communicating with each of the cooling plate sections C, D and E. The continuous component 300 may be bent generally at the intersection of lines C-D and D-E and utilized to make a battery in a manner similar to that as described for FIGS. 6-7.

The above description of embodiments of the invention is merely exemplary in nature and, thus, variations thereof are not to be regarded as a departure from the spirit and scope of the invention.

What is claimed is:

1. A method of assembling a battery comprising providing a single substrate having a plurality of spaced-apart battery cooling plates having cooling channels defined therein, the single substrate comprising a connection portion joining adjacent cooling plates and the connection portion includes at least one cooling channel communicating with a cooling channel of each of the adjacent cooling plates, attaching a battery cell to at least one or both sides of each cooling plate, bending the connection portion so that adjacent cooling plates are positioned in an overlying position with respect to each other, with the battery interposed between the cooling plates in the overlying position.

2. A method as set forth in claim 1 further comprising providing a cooling fluid inlet manifold flow path and an outlet manifold flow path in the single substrate, and wherein the cooling fluid inlet manifold flow path and the outlet manifold flow path communicate with the at least one cooling channel communicating with each of the adjacent cooling plates.

* * * * *